B. J. MORRISON.
STOPPER.
APPLICATION FILED OCT. 26, 1908.

931,458.

Patented Aug. 17, 1909.
3 SHEETS—SHEET 2.

Witnesses
Frank A. Fahl
Thomas W. McMeans

Inventor
Bartholomew J. Morrison,
By Bradford Hood
Attorneys

B. J. MORRISON.
STOPPER.
APPLICATION FILED OCT. 26, 1908.
931,458.
Patented Aug. 17, 1909.
3 SHEETS—SHEET 3.
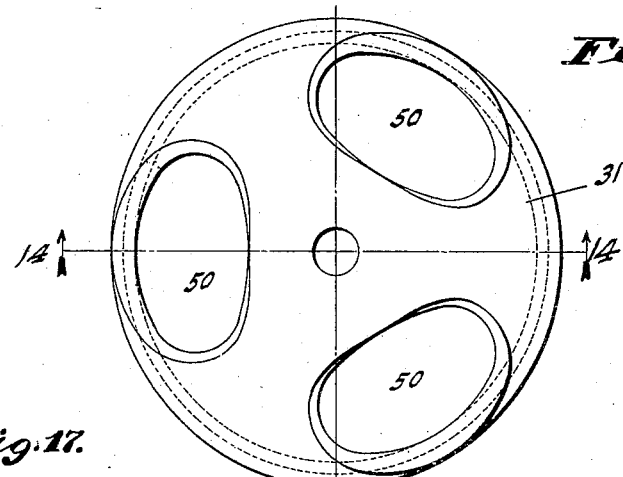
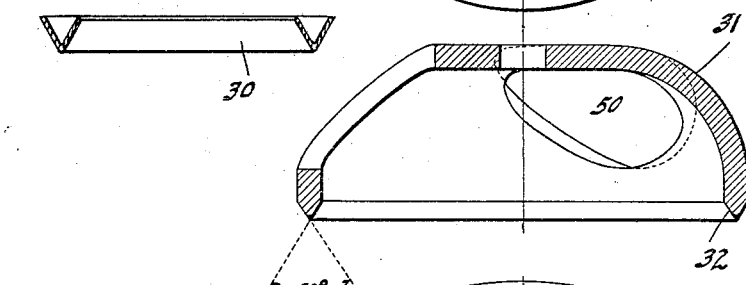
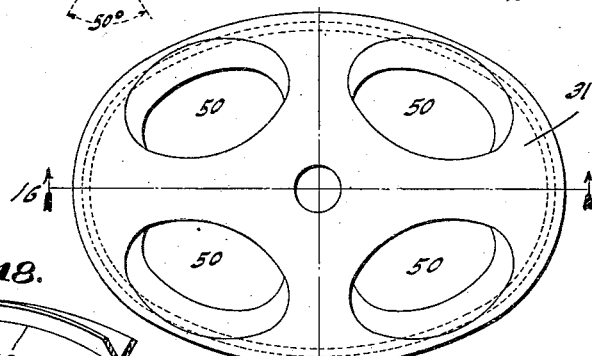
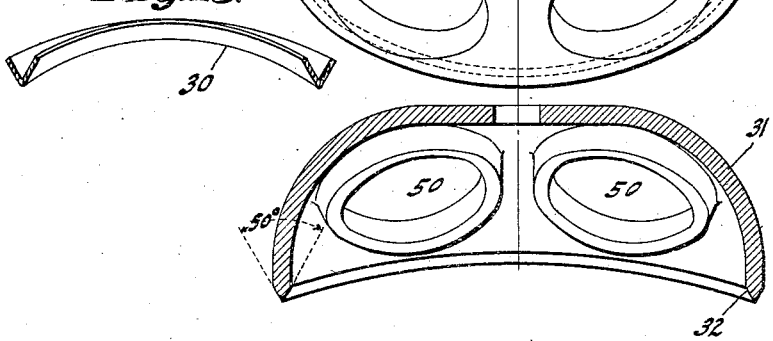
Witnesses
Frank A. Fahl
Thomas W. McMeans
Inventor
Bartholomew J. Morrison,
By Bradford Hood
Attorneys

UNITED STATES PATENT OFFICE.

BARTHOLOMEW J. MORRISON, OF INDIANAPOLIS, INDIANA, ASSIGNOR TO ATLAS ENGINE WORKS, OF INDIANAPOLIS, INDIANA, A CORPORATION OF INDIANA.

STOPPER.

No. 931,458.      Specification of Letters Patent.      Patented Aug. 17, 1909.

Application filed October 26, 1908. Serial No. 459,621.

*To all whom it may concern:*

Be it known that I, BARTHOLOMEW J. MORRISON, a citizen of the United States, residing at Indianapolis, in the county of Marion and State of Indiana, have invented certain new and useful Improvements in Stoppers, of which the following is a specification.

The object of my invention is to produce a handhole or manhole and stopper of such form that the handhole may be readily and accurately formed, preferably circular, the stopper being nevertheless of such form that it can be readily introduced through the hole and yet so arranged as to prevent withdrawal.

The construction has been especially designed to permit the formation of circular openings but the theory of construction may be as readily applied to openings of other forms.

The accompanying drawings illustrate my invention.

Figure 1:
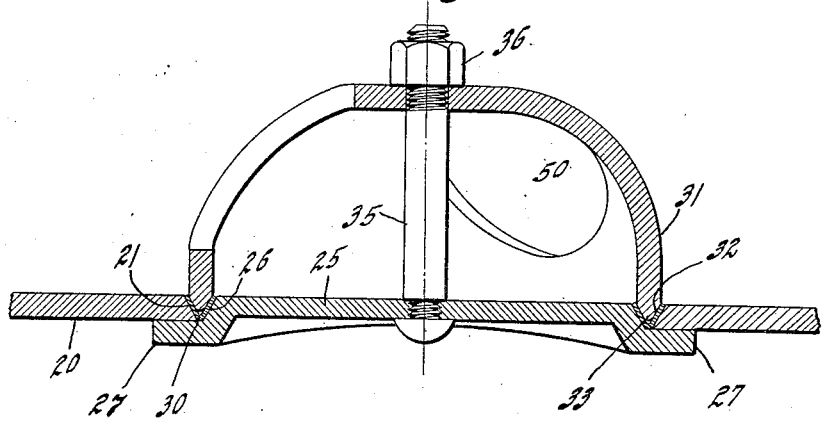
Figure 2:
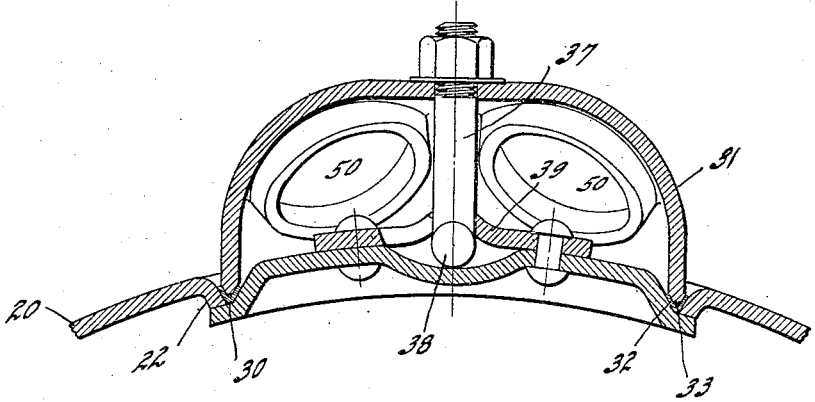
Figure 3:
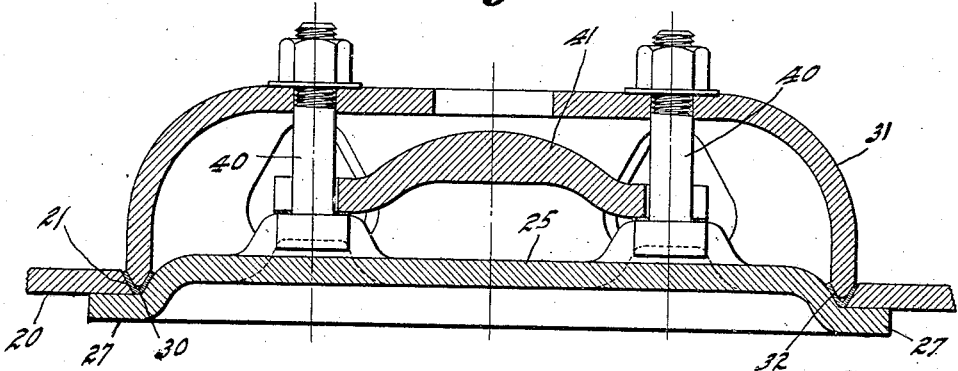
Figure 4:
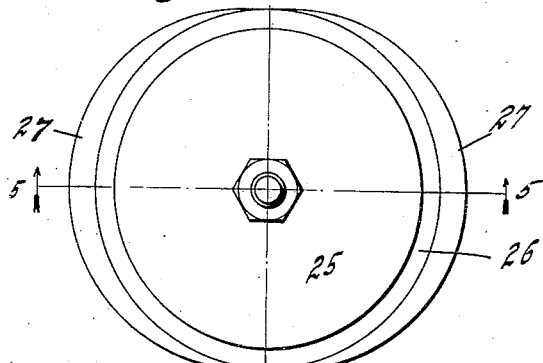
Figure 5:
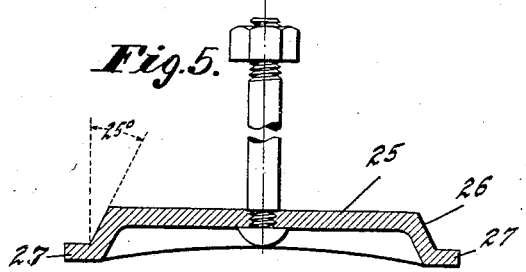
Figure 6:
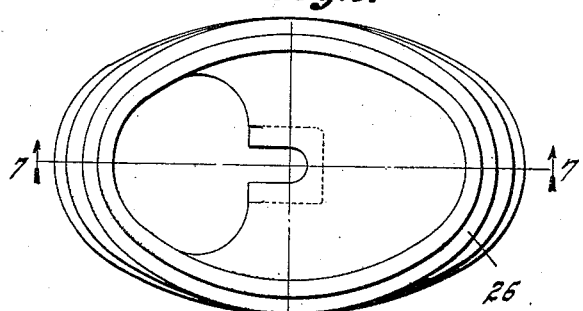
Figure 7:
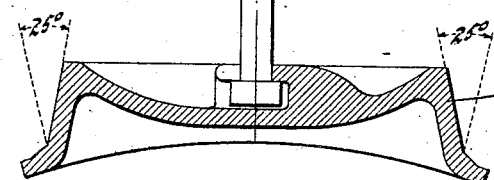
Figure 9:
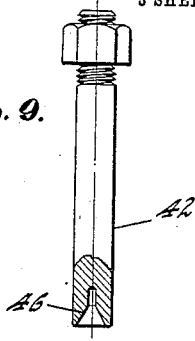
Figure 8:
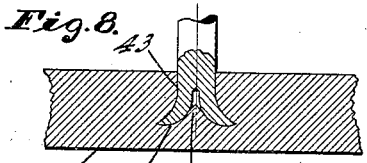
Figure 10:
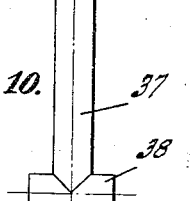
Figure 11:
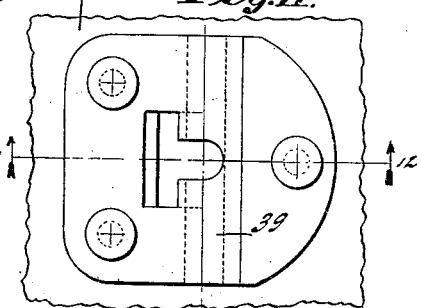
Figure 12:
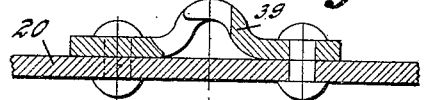

Figure 1 is an axial section of a flat plate through a circular opening and cover therefor, constructed in accordance with my invention; Fig. 2 a similar view showing the invention adapted to an opening formed in a curved plate; Fig. 3 a similar view showing a modified form of stopper for large or elliptical openings; Fig. 4 is a plan of a stopper for a circular opening; Fig. 5 a section on line 5 5 of Fig. 4; Fig. 6 a plan of a stopper suitable for elliptical openings in a curved plate; Fig. 7 a section on line 7 7 of Fig. 6; Fig. 8 a section of a modified means of attaching the bolt to the stopper; Fig. 9 a partial sectional view of the bolt prior to its attachment as shown in Fig. 8; Fig. 10 an elevation of a bolt adapted for use in connection with a stopper having a receiving member like that shown in Fig. 11; Fig. 11 a plan of a form of bolt receiver attached to a stopper plate; Fig. 12 a section on line 12 12 of Fig. 11; Fig. 13 a plan of a holding ring suitably formed for use in conjunction with a circular hole and stopper; Fig. 14 a section on line 14 14 of Fig. 13; Fig. 15 a plan of an elliptical holding ring, such as that shown in Fig. 3; Fig. 16 a section on line 16 16 of Fig. 15; Fig. 17 a diametrical section of a gasket or packing ring suitable for use with a circular opening; Fig. 18 a similar view of a gasket or packing ring suitable for use with an elliptical opening.

In the drawings 20 indicates a flat plate in which the manhole or handhole is to be formed and I form said hole with an outward flare 21 which I have found, by actual practice, to be preferably at an angle of about 65 degrees to the face of the plate. The hole may be formed by drilling and reaming or, if the curvature in the diameter of the holes exceeds half the thickness of the plate, the flare of the opening may be formed by inturning, at the proper angle, a flange 22. The stopper is produced either by casting, or by pressing sheet metal, and comprises a main body 25 which is conical frustum of a size and shape corresponding to the size and shape of the opening 21, the largest dimensions of the frustum being very slightly less than the corresponding dimensions of the opening 21 and the angle of the face 26 of the frustum being preferably equal to the angle of the inclination of the face 21 of the opening. I have found in actual practice that the combined angle between the flaring face 21 of the opening and the surface 26 of the stopper should be about 50 degree, although a considerable variation from this angle if desired. Forming a continuation of the base of the conified portion of the stopper are lune-shaped flanges 27 which do not, therefore, increase one dimension of the stopper. Adapted to fit in the crotch between the flaring wall of the opening and the face 26 of the stopper is a gasket 30 of any suitable material, said gasket being preferably preliminarily formed in cross section to approximate the angle of the crotch. In order to hold the gasket 30 in place I provide a holding ring in the form of an annular arch or dome 31 having its angular edge 32 fitted to correspond to the angle of the crotch already mentioned, the tip 33 of the edge 32 being slightly rounded in order to prevent cutting of the gasket.

Any suitable means may be used to clamp the stopper and ring together so as to hold them in position, as for instance a bolt 35 secured to the main plate of the stopper and having its threaded end projected through the dome, with a nut 36 beyond the same as shown in Fig. 1; or a bolt 37 having a T-head 38 adapted to lie beneath the holding fork 39 secured to the main plate as shown in Figs. 2, 10, 11 and 12; or headed bolts 40 adapted to take beneath the handle member 41 secured to the main plate of the stopper as shown in Fig. 3. If desired, the bolt 42 may be secured to the main plate of the stopper in the manner shown in Figs. 8 and 9, where the main plate is provided with an opening 43 which extends only partially through the plate and is flared at its inner end 44 leaving a central cone 45. The inner end of the bolt is then coned out as shown in 46 and the bolt driven into the plate so that its inner end is swaged outwardly in the manner shown in Fig. 8.

Quite naturally the holding annulus will assume many forms depending upon the size and shape of the openings and the stresses to be endured. As a general rule, however, they can be most conveniently of properly shaped sheet metal having portions removed as indicated at 50 to facilitate the bringing together of the parts and also for the sake of lightness.

In practice the opening 21 will most conveniently be a circular opening because of the ease with which it may be accurately produced. The stopper member, such as is shown in Figs. 4 and 5 is turned edgewise with its shortest diameter parallel with the plate and then inserted through the opening, from the outside to the inside of the plate, and then turned parallel with the plate, its flanges 27 being brought against the inner face of the plate as shown at Fig. 1, said flanges preventing the ejection of the stopper. A proper gasket is then placed in position and the holding annulus clamped thereon, thus forming a perfectly tight joint. The parts may be readily separated and returned to position without injury and the gasket may be readily replaced.

I claim as my invention:—

1. The combination with a plate having an outwardly flared hole therein, of a stopper having flanges adapted to engage the inner face of the plate adjacent the hole, an annular holder having an inner edge beveled to correspond with the outwardly flared hole to hold a gasket onto the flaring edge of the hole and means for clamping the holder and stopper together.

2. The combination with a plate having an outwardly flared hole therein, of a stopper having flanges adapted to engage the inner face of the plate adjacent the hole, a gasket adapted to engage the outwardly flared face of the hole, an annular holder having an inner edge beveled to correspond with the outwardly flared hole to hold the gasket onto the flaring edge of the hole, and means for clamping the holder and stopper in place.

3. The combination with a plate having an outwardly flared opening formed therethrough, of a stopper having a main conical-frustum portion of a diameter less than the diameter of the hole and having flanges projecting from the base of the frustum, a V-shaped gasket adapted to lie in the crotch between the flaring edge of the opening and the conified portion of the stopper, an annular holder having a sharpened edge adapted to receive and hold the gasket into said crotch, and means for clamping the parts in place.

4. The combination with a plate having an outwardly flared opening formed therethrough, of a stopper having a main conical-frustum portion of a diameter less than the diameter of the hole and having flanges projecting from a portion only of the base of the frustum, a V-shaped gasket adapted to lie in the crotch between the flaring edge of the opening and the conified portion of the stopper, an annular holder having a sharpened edge adapted to receive and hold the gasket into said crotch, and means for clamping the parts in place.

5. The combination with a plate having an outwardly flared opening formed therethrough, of a stopper having a main conical-frustum portion of a diameter less than the diameter of the hole and having flanges projecting from the base of the frustum, a V-shaped gasket adapted to lie in the crotch between the flaring edge of the opening and the conified portion of the stopper, an annular holder having a sharpened edge adapted to receive and hold the gasket into said crotch, and means for clamping the stopper and holder together.

6. The combination with a plate having an outwardly flared opening formed therethrough, of a stopper having a main conical-frustrum portion of a diameter less than the diameter of the hole and having flanges projecting from a portion only of the base of the frustum, a V-shaped gasket adapted to lie in the crotch between the flaring edge of the opening and the conified portion of the stopper, an annular holder having a sharpened edge adapted to receive and hold the gasket into said crotch, and means for clamping the stopper and holder together.

In witness whereof, I, have hereunto set my hand and seal at Indianapolis, Indiana, this 20th day of October, A. D. one thousand nine hundred and eight.

BARTHOLOMEW J. MORRISON. [L. S.]

Witnesses:
 FRANZ BOPP,
 R. M. COFFIN.